United States Patent
Beasley

[15] 3,667,521
[45] June 6, 1972

[54] HOLD DOWN ATTACHMENT FOR A SKINNING MACHINE

[72] Inventor: Donald L. Beasley, Des Moines, Iowa

[73] Assignee: Townsend Engineering Company, Des Moines, Iowa

[22] Filed: Aug. 18, 1969

[21] Appl. No.: 850,960

[52] U.S. Cl. .................................146/130, 17/21, 17/62
[51] Int. Cl. .......................................A22c 17/12
[58] Field of Search ............146/130, 100; 83/4, 18, 422, 83/175; 69/13, 19, 21.5; 17/62, 21

[56] References Cited

UNITED STATES PATENTS

| | | | |
|---|---|---|---|
| 2,722,255 | 11/1955 | Townsend | 146/130 |
| 3,130,472 | 4/1964 | Bickford | 83/175 X |
| 3,224,311 | 12/1965 | Wagner | 83/175 |
| 3,324,915 | 6/1967 | Townsend | 146/130 |
| 1,586,100 | 5/1926 | Meyer | 69/13 |

Primary Examiner—Willie G. Abercrombie
Attorney—Zarley, McKee & Thomte

[57] ABSTRACT

A hold down attachment for a skinning machine comprising a hold down roller means rotatably mounted above the feed roller and skinning blade of the skinning machine. The hold down roller means is comprised of a plurality of spaced apart resilient rollers mounted on a driven shaft and adapted to engage the slab being skinned. The configuration of the resilient rollers is such that the slab is simultaneously stretched in two lateral directions as the slab is being skinned which maintains the bottom of the slab in a straight or horizontal condition as it engages the skinning blade. A modified form of the hold down roller means is also disclosed and comprises a plurality of spaced apart rollers, each of which are comprised of four spring loaded shoes extending outwardly from a central hub portion. The spring loaded shoes engage the slab being skinned and simultaneously stretch the slab in two lateral directions as the slab is being skinned to maintain the bottom of the slab in a straight or horizontal condition to achieve the same results as the first described embodiment.

12 Claims, 13 Drawing Figures

PATENTED JUN 6 1972 3,667,521

INVENTOR
DONALD L. BEASLEY
BY
Zarley, McKee & Thomte
ATTORNEYS

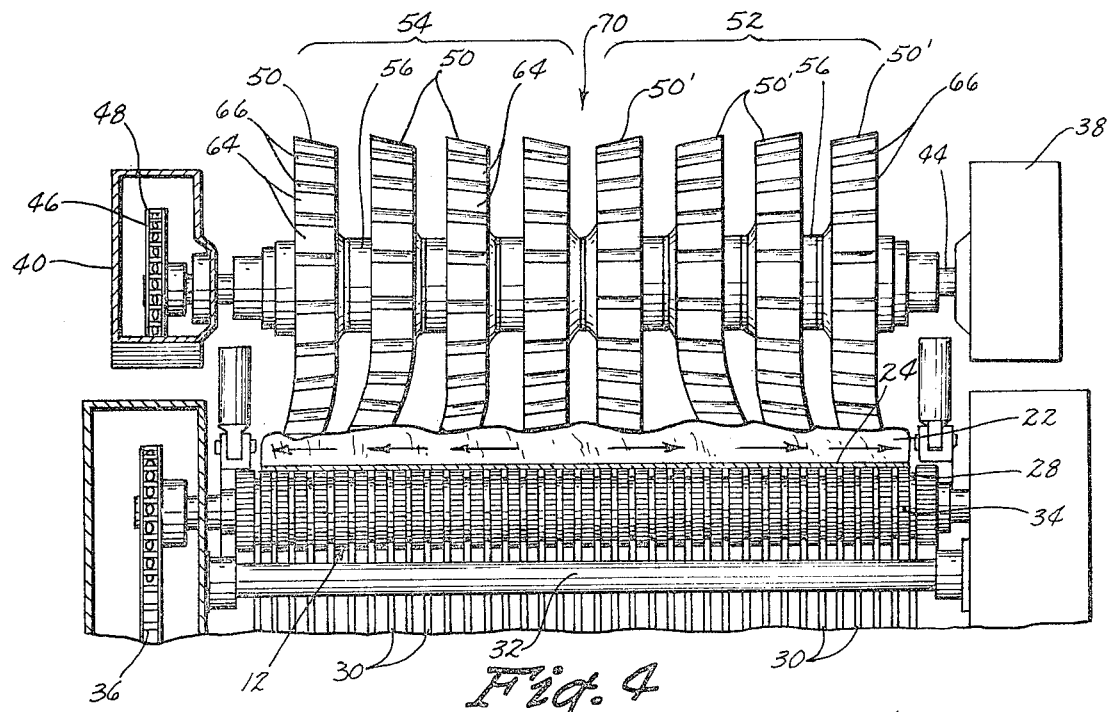
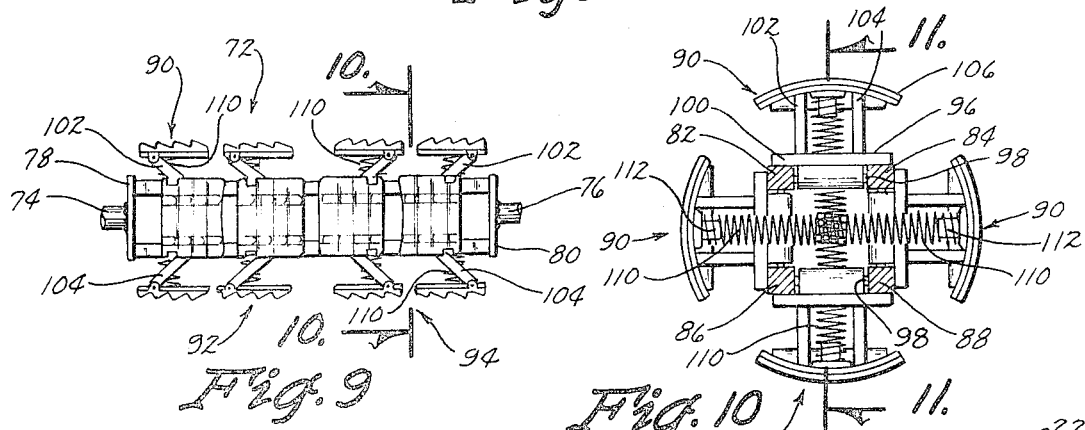
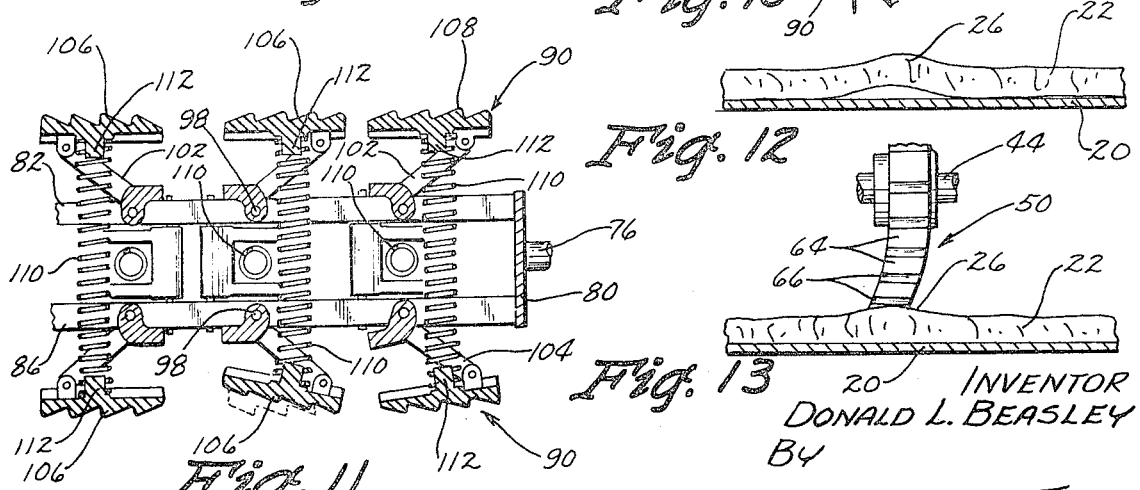

HOLD DOWN ATTACHMENT FOR A SKINNING MACHINE

Skinning machines such as disclosed in U.S. Pat. No. 2,722,255 and U.S. Pat. No. Re. 23,222 are used to remove the skin from a piece of meat such as a slab of bacon or the like. The slab is passed over a horizontally disposed skinning blade which is supposed to remove the skin therefrom. Bacon slabs are commonly curled and frequently have humps on their bottom surface or skin area. While the machine disclosed in U.S. Pat. No. 2,722,255 is generally satisfactory, it has been found that the presence of the curls and humps in the slabs results in the skinning blade failing to remove the entire skin. The incomplete removal of the skin requires manual removal of the same resulting in additional time and expense being expended.

Therefore, it is a principal object of this invention to provide a hold down attachment for a skinning machine.

A further object of this invention is to provide a hold down attachment for a skinning machine which simultaneously stretches the slab in two lateral directions while the skin is being removed therefrom.

A further object of this invention is to provide a hold down attachment for a skinning machine which causes the bottom of the slab to be maintained in a straight or horizontal condition as it is passed over the skinning blade.

A further object of this invention is to provide a hold down attachment for a skinning machine which continually renews its grip on the meat and which spreads the slab on a continuous basis.

A further object of this invention is to provide a hold down attachment for a skinning machine comprising a constantly rotating roller means.

A further object of this invention is to provide a hold down attachment for a skinning machine which insures that all of the skin will be removed from the piece of meat being passed therethrough.

A further object of this invention is to provide a hold down attachment for a skinning machine which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 4 is a sectional view as seen along lines 4—4 of FIG. 2;

FIG. 9 is a front elevational view of a modified form of the attachment;

FIG. 10 is an enlarged sectional view as seen along lines 10—10 of FIG. 9;

FIG. 11 is a sectional view as seen along lines 11—11 of FIG. 10;

FIG. 12 is a cross-sectional view of a slab of bacon illustrating the humps commonly found therein; and FIG. 13 is a sectional view illustrating the slab of bacon passing through the skinning machine.

Figure 1:
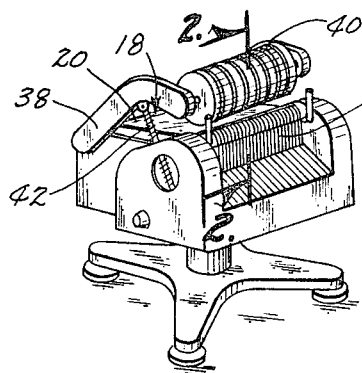
FIG. 1 is a perspective view of a skinning machine having the attachment of this invention mounted thereon.
Figure 3:
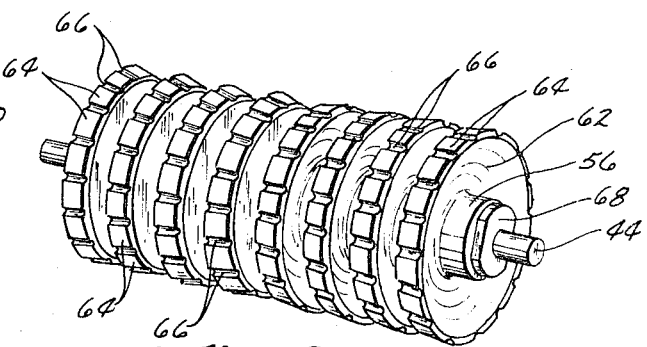
FIG. 3 is a perspective view of the hold down attachment of this invention.
Figure 2:
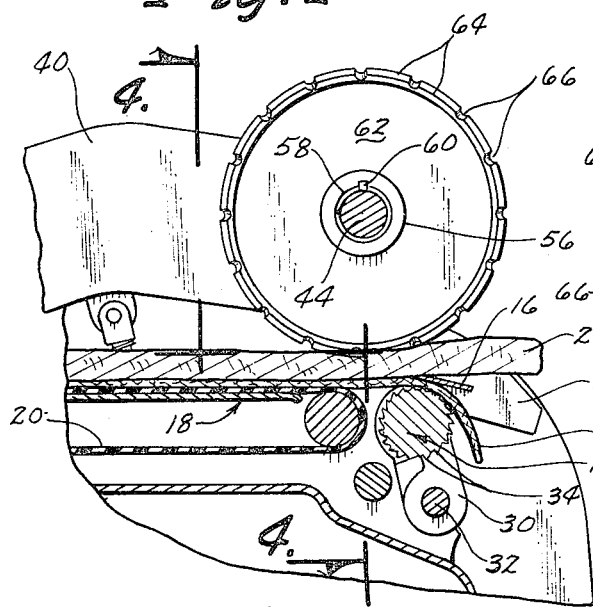
FIG. 2 is an enlarged sectional view as seen along lines 2—2 of FIG. 1.

The numeral 10 generally designates a skinning machine such as disclosed in U.S. Pat. No. Re. 23,222 which includes a feed roller 12, a pressure shoe 14 having a skinning blade 16 attached thereto and a feed table 18. Feed table 18 consists of a rotatable belt 20 suitably mounted on spaced rollers which moves the piece of meat 22 therealong. The piece of meat 22 includes a skin 24 which is to be removed therefrom by the skinning blade 16. As seen in FIG. 12, the piece of meat 22 prior to being skinned includes several humps 26 thereon which have previously interfered with the skinning operation. The piece of meat 22 is not straight due to the fact that it is derived from that portion of the animal carcass which is not originally straight such as the belly.

As seen in FIG. 4, feed roller 12 is provided with a plurality of spaced apart annular grooves 28 formed therein. A plurality of cleaning blades 30 are mounted on shaft 32 and are received by the grooves 28 to aid in keeping the feed roller 12 clean. Feed roller 12 is also provided with corrugations or serrations 34 to aid in the feed roller 12 gripping the meat. The opposite ends of feed roller 12 are suitably journalled as seen in FIG. 4 and roller 12 is driven by a suitable power source through chain 36.

Figures 5, 6:
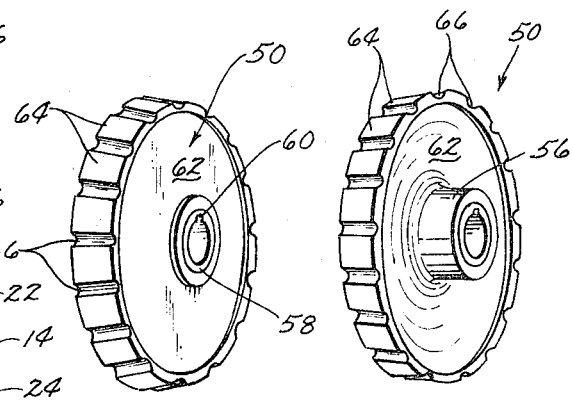
FIG. 5 is a perspective view of one of the resilient rollers of FIG. 3.
FIG. 6 is a perspective view as seen from the other side of the roller of FIG. 5.
Figure 7:
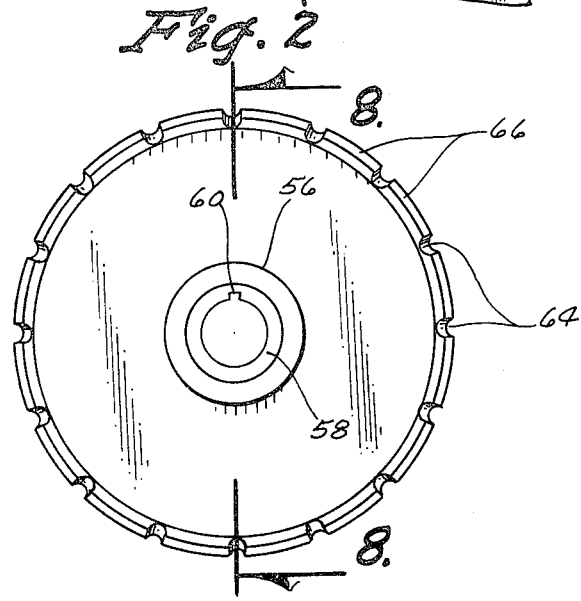
FIG. 7 is a side elevational view of the roller of FIG. 5.
Figure 8:
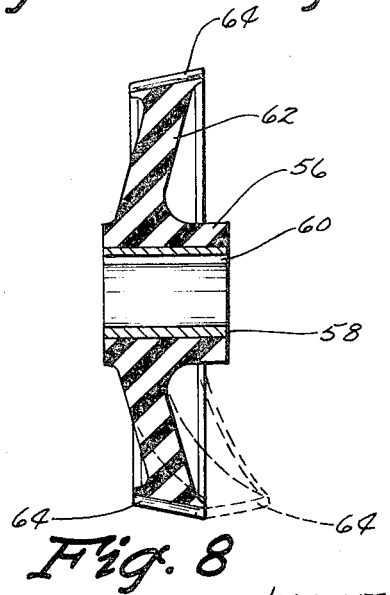
FIG. 8 is a sectional view as seen along lines 8—8 of FIG. 7.

The numerals 38 and 40 refer generally to arcuate brackets which are pivotally connected at their lower ends to the opposite sides of the machine 10 by any convenient means. Brackets 38 and 40 each have a hold down spring means 42 connected thereto intermediate the length thereof which yieldably urges the forward ends of the brackets 38 and 40 downwardly towards the machine 10. A shaft 44 extends between brackets 38 and 40 and has its opposite ends rotatably received thereby as illustrated in FIG. 4. One end of shaft 44 has a sprocket 46 mounted thereon having a chain 48 extending therearound. Chain 48 extends downwardly through the hollow interior of bracket 40 and would be suitably connected to a convenient power source. A plurality of resilient rollers 50 are mounted on shaft 44 for rotation therewith and are arranged in groups 52 and 54. Inasmuch as all of the rollers 50 are identical, only one roller will be described in detail with similar structure on the other rollers being indicated by "'. " Roller 50 includes a central hub portion 56 having a metal bushing 58 extending therethrough and having a keyway 60 formed therein. Roller 50 includes a rib portion 62 which extends angularly outwardly from hub portion 56 adjacent one end thereof as seen in FIG. 8. The roller 50 is provided with a tapered or inclined peripheral rim portion 64 having a plurality of grooves 66 formed therein as seen in FIG. 5. The rollers 50 are maintained on the shaft 44 by suitable nuts 68 or the like and a key is received in the keyway 60 and a suitable keyway formed in the shaft 44 so that the rollers 50 will rotate with shaft 44. The rollers 50 are arranged in groups 52 and 54 as previously stated. As seen in FIG. 4, the group 52 includes four of the rollers 50' so arranged on the shaft 44 so that rim portion 64 is disposed in a manner illustrated therein. Group 54 is mounted oppositely to that of group 52 so that the peripheral rim portions 64 extend inwardly towards the center of the hold down roller while the peripheral rim portions of the group 52 extend inwardly towards the center of the hold down roller. For purposes of description, the plurality of rollers 50 will be described as comprising the hold down roller 70.

The method of operation of the embodiment of FIGS. 1–8 is as follows. The rollers 70 and 12 would be caused to rotate by activating the power sources connected thereto as would be belt 20. The slab 22 is placed on the belt 20 and the movement of the same would cause the forward end thereof to pass into engagement with the rotating rollers 50. The rotating feed roller 12 grips the under side or skin of the meat 22 and aids in pulling the meat through the machine so that the blade 16 can remove the skin 24 therefrom. The spring loaded hold down assembly 42 urges the hold down roller 70 in engagement with the upper surface of the meat 22 which causes the rollers 50 to be compressed and deflected in the manner illustrated in FIG. 4 when the same encounter the irregular surface of the meat. The relationship of the inclined or tapered peripheral rim portions on the rollers of the groups 52 and 54 is such that the rollers in group 54 are deflected towards the left while the rollers of the group 52 are deflected to the right as viewed in FIG. 4.

The rollers 50 flatten the meat 22 as it is being fed to the cutting blade 16 and laterally compresses or stretches the slab simultaneously in two directions to insure that the skin 24 will be in a straight or horizontal condition as it engages the cutting blade 16 so that all of the skin will be removed from the meat 22. The rollers 50 flatten the high places on the surface of the meat and avoid bunching, bulging, etc. problems which are ordinarily encountered in conventional skinning machines. The driven resilient rollers 50 are constantly rotating and continually renewing their grip on the meat as the meat is being passed through the machine. The rotating rollers 50 continually and simultaneously stretch the slab in two lateral directions in a manner which is not interrupted at any time during the skinning operation. Thus it can be seen that the hold down roller 70 insures that the meat will be properly skinned in an efficient and economical manner.

A modified form of the hold down roller is seen in FIGS. 9–11 and is generally referred to by the reference numeral 72. The numerals 74 and 76 refer generally to shafts which would be suitably rotatably mounted in the brackets 38 and 40 and would be driven by a suitable power means. End plates 78 and 80 are secured to shafts 74 and 76 respectively by welding or the like and have square rods 82, 84, 86 and 88 secured thereto and extending between as seen in FIGS. 9–11. A plurality of spring loaded shoe assemblies 90 are secured to the square rods and are arranged in groups 92 and 94 as seen in FIG. 9. Inasmuch as each of the shoe assemblies 90 are identical, except for the opposite arrangement of the groups 92 and 94, only one of the shoe assemblies will be described in detail.

As seen in FIG. 10, a bracket 96 is pivotally connected to rods 82 and 84 by a pin means 98 and includes a base portion 100 having a pair of legs 102 and 104 secured thereto and extending outwardly therefrom. A pivotal shoe 106 is pivoted to the outer ends of arms 102 and 104 and is provided with a plurality of corrugations or serrations 108 therein. As seen in FIGS. 10 and 11, a coil spring means 110 has it opposite ends received by the tabs 112 on the underside of the shoes 106 and extend between oppositely disposed shoes as illustrated therein. As seen in FIG. 11, the shoes 106 are normally substantially parallel to the square rods but are pivotal to the position illustrated by broken lines in FIG. 11 and to the position illustrated at the right side of FIG. 11. It can be seen in FIG. 9 that the arms 102 and 104 of the shoe assemblies 90 of the group 92 extend away from the center of the hold down roller 72 while the arms 102 and 104 of the shoe assemblies 90 of group 94 extend outwardly from the center of hold down roller 72 in a direction opposite that of the other group.

The hold down roller 72 functions somewhat similarly to the hold down roller 70 in that the slab is simultaneously stretched and compressed in two lateral directions while the same is being skinned. The shoes 106 are responsive to upwardly extending irregularities in the slab and will pivot from the position illustrated in the center of FIG. 11 to the position illustrated at the right side of FIG. 11 upon encountering such an upwardly extending irregularity. The bracket 96 pivots as does the shoe 106 so that the meat is compressed and laterally stretched outwardly from the center thereof. The opposite relationship of the shoes of the groups 92 and 94 insures that the meat will be simultaneously stretched in two lateral directions so that the skin of the meat will be in a straight or horizontal condition as it engages the cutting blade to insure that the skin will be entirely removed in an efficient and economical manner. The fact that the shoe assemblies 90 are continually rotating causes the roller 72 to renew its grip and spread or stretch the slab on a continual basis in an uninterrupted manner.

Thus it can be seen that both of the attachments accomplish at least all of the stated objectives.

I claim:

1. In a meat skinning machine, comprising,
a meat supporting means and a skinning blade,
a meat hold down roller positioned above said meat supporting means and said skinning blade to hold a slab of meat in a flat condition during the meat skinning operation,
said hold down roller comprising a horizontal shaft means, a plurality of separate spaced apart roller elements on said shaft means, a peripheral portion of said roller elements being angularly disposed with respect to said shaft means whereupon vertical pressure exerted thereon by a meat slab passing between said roller and said meat supporting means will cause said rollers to exert both a compressive and lateral force on said meat slab to force said meat slab into a flattened condition.

2. In a meat skinning machine, comprising,
a meat supporting means and a skinning blade,
a meat hold down roller positioned above said meat supporting means and said skinning blade to hold a slab of meat in a flat condition during the meat skinning operation,
said hold down roller comprising a horizontal shaft means, a plurality of roller elements on said shaft means, a portion of said roller elements being angularly disposed with respect to said shaft means whereupon vertical pressure exerted thereon by a meat slab passing between said roller and said meat supporting means will cause said rollers to exert both a compressive and lateral force on said meat slab to force said meat slab into a flattened condition,
each of said roller elements being comprised of a hub portion mounted on said shaft means and having a web portion extending outwardly therefrom, and an inclined peripheral rim portion at the outer end of said web portion.

3. The apparatus of claim 2 wherein the roller elements are arranged in two groups on said shaft means, one of said groups being positioned between the center of said shaft means and one end of the hold down roller, the other of said groups being positioned between the center of said shaft means and the other end of the hold down roller, the inclined rim portions of said two groups being oppositely disposed so that the rim portions in said groups extend outwardly and towards the respective ends of the hold down roller.

4. The apparatus of claim 2 wherein said rim portion has a plurality of gripping grooves formed therein.

5. In a meat skinning machine, comprising,
a meat support means and a skinning blade,
a meat hold down roller positioned above said meat supporting means and said skinning blade to hold a slab of meat in a flat condition during the meat skinning operation,
said hold down roller comprising a horizontal shaft means, a plurality of roller elements on said shaft means, a portion of said roller elements being angularly disposed with respect to said shaft means whereupon vertical pressure exerted thereon by a meat slab passing between said roller and said meat supporting means will cause said rollers to exert both a compressive and lateral force on said meat slab to force said meat slab into a flattened condition,
each of said roller elements comprising a plurality of oppositely disposed shoe means, a shaft means, connecting means movably supporting said shoe means on said shaft means, said shoe means each comprising a bracket pivotally secured to said shaft means and angularly disposed to the longitudinal axis of said shaft means, a shoe element pivotally secured to said bracket, and a spring means connected to said shoe element to normally hold said shoe element in a position of alignment with said shaft means, whereupon a vertical force imposed on said shoe element in a direction towards said shaft means by a protrusion on a piece of meat passing through said meat skinning machine will cause said bracket to pivot towards said shaft means, and said shoe element will pivot with respect to said bracket to thereupon exert both compressive and lateral stretching forces on said piece of meat.

6. In a meat skinning machine, comprising,
a meat supporting means and a skinning blade, a meat hold down roller positioned above said meat supporting means and said skinning blade to hold a slab of meat in a flat condition during the meat skinning operation, said hold down roller comprising a horizontal shaft means, a plurality of roller elements on said shaft means, a portion of said roller elements being angularly disposed with respect to said shaft means whereupon vertical pressure exerted thereon by a meat slab passing between said roller and said meat supporting means will cause said rollers to exert both a compressive and lateral force on said meat slab to force said meat slab into a flattened condition, said shaft means including four spaced apart parallel rods having their opposite ends operatively rotatably mounted on the skinning machine, each of said roller elements comprising four spaced apart, spring loaded shoe assemblies pivotally secured to said rods, each of said shoe assemblies comprising a bracket pivotally secured to and extending between a pair of said rods, said bracKet extending outwardly and laterally from said rods, a shoe pivotally secured to the outer end of said bracket, and a coil spring means extending between oppositely disposed shoes adapted to cause the pivotal movement of the shoe associated therewith upon the shoe engaging up upwardly extending irregularity of the piece of meat being skinned.

7. The apparatus of claim 6 wherein said brackets have limiting means thereon adapted to engage said rods to limit the pivotal movement thereof in one direction.

8. The apparatus of claim 7 wherein said roller elements are arranged in two groups on said rods, one of said groups being positioned between the center of said hold down roller and one end thereof, the other of said groups being positioned between the center of said hold down roller and the other end thereof, said brackets of said one group extending outwardly and laterally from said rods toward said one end, said brackets of said other group extending outwardly and laterally from said rods toward said other end, said shoes being pivotally secured to said brackets and said springs being connected to said shoes so that the shoes of said one group will compress and stretch the meat away from the center of the hold down roller towards said one end and so that the shoes of said other group will compress and stretch the meat away from the center of the hold down roller towards said other end to stretch the meat in said two lateral directions.

9. In a meat skinning machine, comprising,
a meat supporting means and a skinning blade,
a meat hold down roller positioned above said meat supporting means and said skinning blade to hold a slab of meat in a flat condition during the meat skinning operation,
said hold down roller comprising a horizontal shaft means, a plurality of roller elements on said shaft means, a portion of said roller elements being angularly disposed with respect to said shaft means whereupon vertical pressure exerted thereon by a meat slab passing between said roller and said meat supporting means will cause said rollers to exert both a compressive and lateral force on said meat slab to force said meat slab into a flattened condition,
said roller elements being comprised of a plurality of spring loaded, pivotal shoes secured to said shaft means.

10. In a meat skinning machine, comprising,
a meat supporting means and a skinning blade,
a meat hold down roller positioned above said meat supporting means and said skinning blade to hold a slab of meat in a flat condition during the meat skinning operation;
said hold down roller comprising a horizontal shaft means, a plurality of separate spaced apart roller elements on said shaft means, said roller elements having a portion extending radially outwardly and obliquely with respect to said shaft whereupon vertical pressure exerted thereon by a meat slab passing between said roller and said meat supporting means will cause said rollers to exert both a compressive and lateral force on said meat slab to force said meat slab into a flattened condition.

11. A machine according to claim 10 wherein each of said roller elements includes an annular rim, said rim having a tapered surface for causing said roller element to deflect in response to pressure between said roller element and said meat slab.

12. A machine according to claim 1 wherein said peripheral portion is an annular rim having a tapered surface for causing said roller element to deflect in response to pressure between said roller element and said meat slab.

* * * * *